(12) United States Patent
Poulin et al.

(10) Patent No.: US 10,601,611 B1
(45) Date of Patent: Mar. 24, 2020

(54) METHOD AND APPARATUS FOR PROVIDING RESILIENCY FOR DELAY SENSITIVE SERVICES

(71) Applicant: NOKIA SOLUTIONS AND NETWORKS OY, Espoo (FI)

(72) Inventors: André Poulin, Gatineau (CA); Kin-Yee Wong, Ottawa (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/143,052

(22) Filed: Sep. 26, 2018

(51) Int. Cl.
| | |
|---|---|
| *H04L 12/46* | (2006.01) |
| *H04L 12/707* | (2013.01) |
| *H04L 12/841* | (2013.01) |
| *H04L 12/913* | (2013.01) |
| *H04L 12/54* | (2013.01) |
| *H04L 12/70* | (2013.01) |

(52) U.S. Cl.
CPC .......... *H04L 12/4633* (2013.01); *H04L 12/56* (2013.01); *H04L 45/22* (2013.01); *H04L 47/283* (2013.01); *H04L 47/724* (2013.01); *H04L 2012/5648* (2013.01); *H04L 2012/5649* (2013.01)

(58) Field of Classification Search
CPC . H04L 12/4633; H04L 47/724; H04L 47/283; H04L 12/56; H04L 45/22; H04L 2012/5648; H04L 2012/5649; H04L 43/087; H04L 45/68
See application file for complete search history.

(56) References Cited

U.S. PATENT DOCUMENTS

| | | | |
|---|---|---|---|
| 8,503,458 B1 * | 8/2013 | Modi ................... | H04J 3/0632 370/395.53 |
| 2003/0169755 A1 * | 9/2003 | Ternovsky .......... | H04L 12/6418 370/412 |
| 2010/0085990 A1 * | 4/2010 | Belhadj ................ | H04J 3/0667 370/517 |
| 2013/0086280 A1 * | 4/2013 | James ................. | H04L 12/4625 709/238 |
| 2014/0032799 A1 * | 1/2014 | Dickson ................. | G06F 13/00 710/104 |
| 2015/0172154 A1 * | 6/2015 | Wong ..................... | H04L 43/087 370/244 |
| 2018/0287725 A1 * | 10/2018 | Rabinovich ........... | H04J 3/0667 |

* cited by examiner

*Primary Examiner* — Hoang-Chuong Q Vu
(74) *Attorney, Agent, or Firm* — Kramer Amado, P.C.

(57) ABSTRACT

Various embodiments relate to a method and apparatus for guaranteeing symmetrical delay in both directions for a Time-Division Multiplexing Pseudowire ("TDM-PW") service on a packet switching network ("PSN"), the method including the steps of using a transport method to specify a first path including a corresponding pair of unidirectional service tunnels for the TDM PW service between a master router and a slave router, detecting a failure on either of the corresponding pair of unidirectional service tunnels of the first path between the master router and the slave router, switching the master router and the slave router to a second path including a corresponding pair of unidirectional service tunnels, resetting a jitter buffer on the master router and the slave router and adjusting the jitter buffer to a halfway point, and transmitting and receiving data using the second path including the corresponding pair of unidirectional service tunnels.

22 Claims, 4 Drawing Sheets

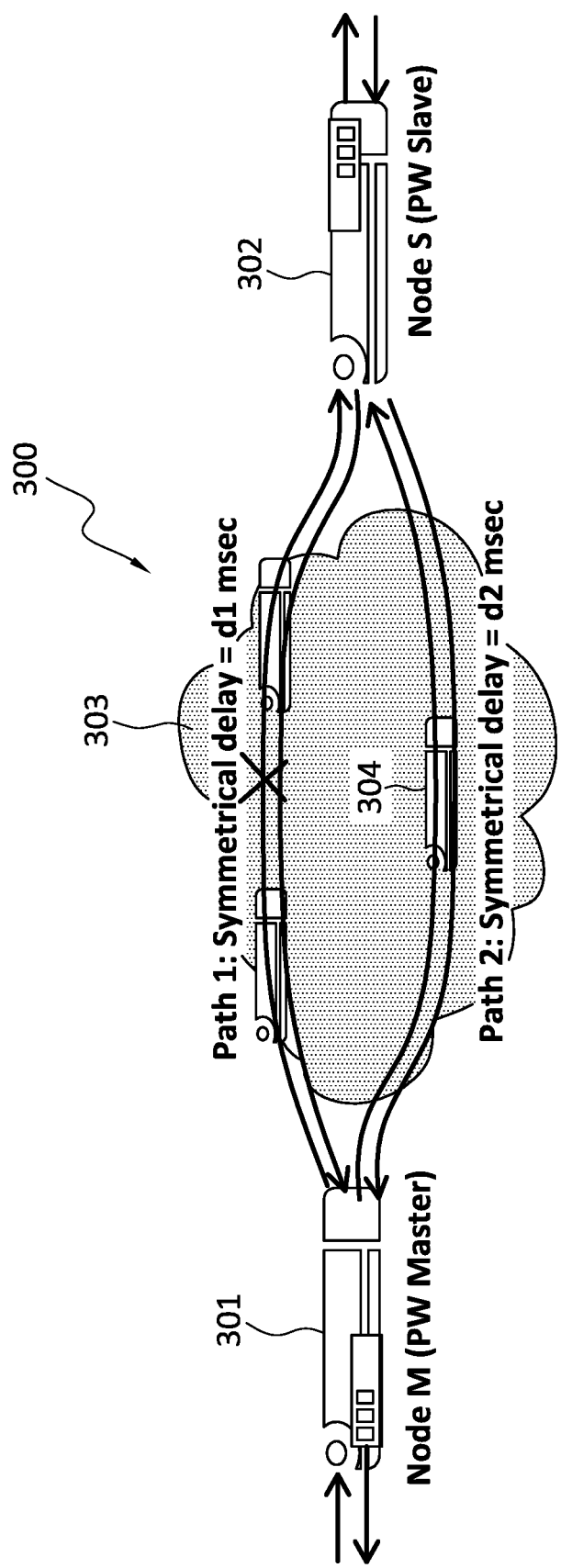
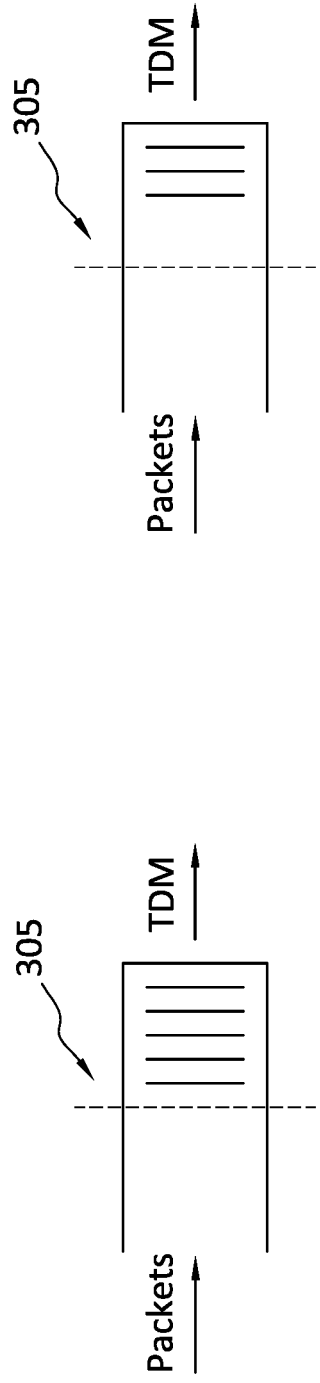
FIG. 3A
FIG. 3B
FIG. 3C

US 10,601,611 B1

METHOD AND APPARATUS FOR PROVIDING RESILIENCY FOR DELAY SENSITIVE SERVICES

TECHNICAL FIELD

This disclosure relates generally to providing symmetric delay communication between teleprotection relays, and more specifically, but not exclusively, changes required to IP/MPLS network elements in order to provide symmetric delays.

BACKGROUND

Services and/or equipment in telecommunications networks may require symmetrical communication, or identical latency in both directions between two sites. For example, current differential relay monitoring for teleprotection purposes requires symmetrical communication channels for operation.

This type of equipment has typically been connected using Time-Division Multiplexing ("TDM") Wide-Area Network ("WAN") and currently these types of symmetry-sensitive devices may be interconnected using packet-based networks, for example, IP/MPLS WAN. In order to interconnect this type of equipment over a packet switched network ("PSN"), TDM PseudoWire ("PW") is used, which uses a jitter buffer to counter the effects of packet delay variation in the network.

Guaranteeing symmetry over a packet switched network may also be addressed by proper network design and also with features such as Asymmetry Delay Compensation ("ADC") which is disclosed in U.S. Pat. Pub. No. 2015/0172154 A1, which discloses guaranteeing the symmetry of the jitter buffers for the TDM PW.

SUMMARY

A brief summary of various embodiments is presented below. Embodiments address a method and apparatus for providing resiliency for delay sensitive services.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments relate to a method for guaranteeing symmetrical delay in both directions for a Time-Division Multiplexing Pseudowire ("TDM-PW") service on a packet switching network ("PSN"), the method including the steps of using a transport method to specify a first path including a corresponding pair of unidirectional service tunnels for the TDM PW service between a master router and a slave router, detecting a failure on either of the corresponding pair of unidirectional service tunnels of the first path between the master router and the slave router, switching the master router and the slave router to a second path including a corresponding pair of unidirectional service tunnels, resetting a jitter buffer on the master router and the slave router and adjusting the jitter buffer to a halfway point and transmitting and receiving data using the second path including the corresponding pair of unidirectional service tunnels.

In an embodiment of the present disclosure, the method for guaranteeing symmetrical delay in both directions for a TDM PW service on a PSN, further including the step of running a Asymmetry Delay Compensation ("ADC") sampling algorithm after switching to the second path.

In an embodiment of the present disclosure, detecting that the first path is unavailable is by one of detection of a loss of signal, bidirectional forwarding detection failure, label-switched path being down and the pair of corresponding service tunnels of the first path and the pair of corresponding service tunnels of the second path being down.

In an embodiment of the present disclosure, the master router and the slave router include the pair of corresponding service tunnels of the first path and the pair of corresponding service tunnels of the second path which provide the first path and the second path between the master router and the slave router.

In an embodiment of the present disclosure, the first path and the second path include two unidirectional label-switched paths with strict hop-by-hop routing over the master router and the slave router.

In an embodiment of the present disclosure, the TDM PW service discards any data which is received on the second path before the switching to the second path.

In an embodiment of the present disclosure, the TDM PW service discards any data which is received on the first path after the switching to the second path.

In an embodiment of the present disclosure, running the ADC sampling algorithm adjusts the jitter buffer to a halfway point.

In an embodiment of the present disclosure, the jitter buffer is reset through a control plane through internal control messaging with in-band control messaging.

In an embodiment of the present disclosure, the jitter buffer is reset through a control plane through internal control messaging with out-of-band control message through a control plane communication channel.

In an embodiment of the present disclosure, the jitter buffer is reset through a dataplane including ingress processing and egress processing.

Various embodiments relate to a non-transitory computer readable medium storing program code for guaranteeing symmetrical delay in both directions for a TDM PW service on a PSN, the program code being executable by a processor to perform operations including using a transport method to specify a first path including a corresponding pair of unidirectional service tunnels for the TDM PW service between a master router and a slave router, detecting a failure on either of the corresponding pair of unidirectional service tunnels of the first path between the master router and the slave router, switching the master router and the slave router to a second path including a corresponding pair of unidirectional service tunnels, resetting a jitter buffer on the master router and the slave router and adjusting the jitter buffer to a halfway point and transmitting and receiving data using the second path including the corresponding pair of unidirectional service tunnels.

In an embodiment of the present disclosure, the non-transitory computer readable medium, further including running a Asymmetry Delay Compensation ("ADC") sampling algorithm after switching to the second path.

In an embodiment of the present disclosure, detecting that the first path is unavailable is by one of detection of a loss of signal, bidirectional forwarding detection failure, label-switched path being down and the pair of corresponding service tunnels of the first path and the pair of corresponding service tunnels of the second path being down.

In an embodiment of the present disclosure, the master router and the slave router include the pair of corresponding service tunnels of the first path and the pair of corresponding service tunnels of the second path which provide the first path and the second path between the master router and the slave router.

In an embodiment of the present disclosure, the first path and the second path include two unidirectional label-switched paths with strict hop-by-hop routing over the master router and the slave router.

In an embodiment of the present disclosure, the TDM PW service discards any data which is received on the second path before the switching to the second path.

In an embodiment of the present disclosure, the TDM PW service discards any data which is received on the first path after the switching to the second path.

In an embodiment of the present disclosure, running the ADC sampling algorithm adjusts the jitter buffer to a half-way point.

In an embodiment of the present disclosure, the jitter buffer is reset a control plane through internal control messaging with in-band control messaging.

In an embodiment of the present disclosure, the jitter buffer is reset through a control plane through internal control messaging with out-of-band control message through a control plane communication channel.

In an embodiment of the present disclosure, the jitter buffer is reset through a dataplane including ingress processing and egress processing.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims, and explain various principles and advantages of those embodiments.

These and other more detailed and specific features are more fully disclosed in the following specification, reference being had to the accompanying drawings, in which:

FIGS. 3A, 3B, and 3C illustrate a block diagram where multiple paths exist where there is deferred asymmetry after a path switchover in the current embodiment;

DETAILED DESCRIPTION

Figure 1:
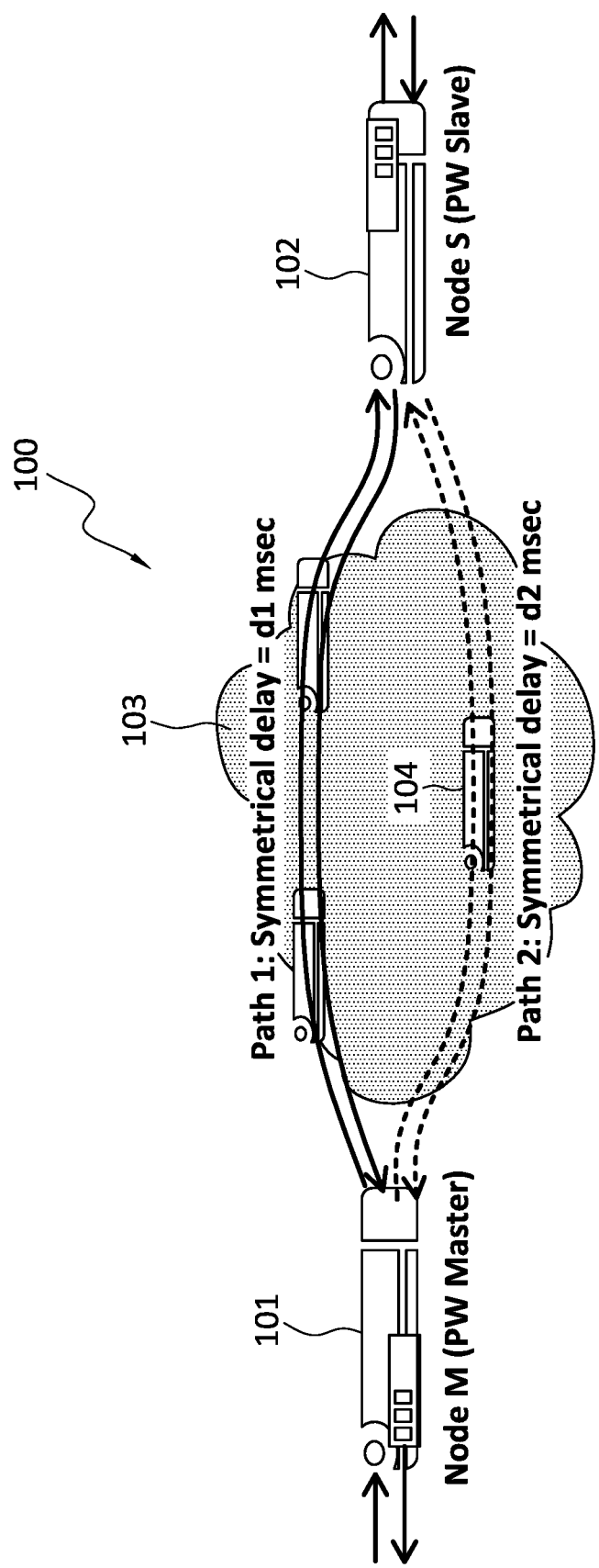
FIG. 1 illustrates a block diagram for multiple paths where the TDM PW uses PW redundancy to ensure the same path is used in the current embodiment.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

For example, in order to provide symmetry for a TDM PW, which may be used for teleprotection over the PSN, the network design must guarantee that both directions of the transportation method for the TDM PW traverses the network through the same nodes and the same interfaces. Therefore, the transportation method, whether unidirectional or bidirectional, must provide the ability to specify the path for the TDM PW in order to provide symmetry.

For example, using Resource Reservation Protocol with Traffic Engineering ("RSVP-TE") with strict hops provides symmetry. Therefore by using both RSVP-TE strict hop LSP to transport the TDM PW for the teleprotection and by using an ADC feature to guarantee jitter buffer symmetry, the latency in both directions is within the tolerance limit of the symmetry sensitive devices.

However, resiliency may also be required to guarantee functionality of the teleprotection equipment when the packet switched network experiences unexpected failures. Symmetry must also be maintained after switching to the protection path, which the resiliency method does not provide.

Many transportation methods may provide their own resiliency methods including fast switch times, but these types of methods may not be meeting the requirement of symmetry for teleprotection devices, for example, RSVP-TE with Fast Reroute ("FRR").

When performing corrective action on the protection path at the point of local repair ("PLR"), the corrective action only occurs in a single direction, because RSVP LSP are unidirectional in nature and therefore, the corrective action may only modify the latency in a single direction which would cause asymmetry. The asymmetry is detected by the teleprotection equipment which may erroneously determine that the power line being monitored are in a problematic state and would take corrective actions, for example, shut down the section of the power lines which are not in a problematic state.

Therefore, the resiliency method for the transport of the TDM PW used for teleprotection devices must be required to perform corrective action in both directions to guarantee symmetry on the TDM PW.

For example, a bidirectional resiliency method which is required to guarantee symmetry on the TDM PW is pseudowire redundancy with a Master-Slave relationship. The pseudowire redundancy method allows for the setup of multiple endpoints, each endpoint being a corresponding pair of unidirectional service tunnels, called service tunnel pair for the rest of this document, for a TDM PW service. The pseudowire redundancy with the Master-Slave relationship allows a Master to control which service tunnel pair is the active endpoint and therefore, the slave will only switch to a protection service tunnel pair when requested to from the Master.

By having multiple redundant service tunnel pairs, each path for the transportation method may be specified. The trigger to switch to a protection path may come from different sources, for example, from bidirectional forwarding detection ("BFD"), open shortest path first ("OSPF") or local port status.

FIG. 1 illustrates a block diagram 100 for multiple paths where the TDM PW uses PW redundancy to ensure the same path is used in the current embodiment.

In the current embodiment, by enabling PW redundancy in an active/protection mode for the TDM PW service with a single or multiple service access point and at least two service tunnels pairs with unique paths for each router, the same path is used. One of the routers is designated as the Signaling-Master or Master 101 and the other routers is designated as the Signaling-Slave or Slave 102. The two service tunnel pairs from each router provide two paths between the two routers. Path 1 103 has a symmetrical delay of d1 msec and Path 2 104 has a symmetrical delay of d2 msec. Each path includes two unidirectional LSPs with strict hop-by-hop routing over the same router and preferably over the same interface.

The path may be detected as unavailable by loss of signal ("LOS"), bidirectional forwarding detection ("BFD") failure, label switch path ("LSP") failure, interior gateway protocol ("IGP") failures and service tunnel failure.

When the TDM PW switches to a protection path, the Master 101 sends a request to the Slave 102 to switch to the protection path and therefore, symmetry is guaranteed if both endpoints only transmit on the active service tunnel pair and only receive from the active service tunnel pair.

In the current embodiment, the receiving side may accept traffic from the active and all protection endpoints in order to provide a faster switch time. However, the symmetry may be compromised since traffic would be accepted from two different service tunnel pairs which may affect the jitter buffer level, if the jitter buffer never underruns. If the jitter buffer never underruns, the latency in both directions may be different and the teleprotection devices may detect that difference in latency and take a corrective action, however, this is a false-positive corrective action from the teleprotection device.

Currently, when Path 1 103 is used as an active path, a path failure may occur which invokes an automatic recovery for the TDM service to switch to Path 2 104. However, if the switch from Path 1 103 to Path 2 104 is fast enough, there may be no underrun of the jitter buffer in one or both directions. The total service latency may not have changed; however, the average jitter buffer fill may no longer be at the middle point and no longer result in the "engineered" jitter buffer latency.

Therefore, when the TDM resets, for example, when it underruns or overruns, the ADC will reset the jitter buffer latency to be correct, which will cause an asymmetry if one direction was reset and the other direction was not reset.

PW redundancy may allow reception of packets from both the active and the protection paths, meaning the transmit direction has changed. However, since the communication between the Master 101 and the Slave 102 is not instantaneous, the switching of the path may be slightly delayed in one direction and any existing packets may also be delayed, which may cause asymmetry.

The current embodiment is directed towards ensuring symmetrical delay in both directions when using resiliency with a TDM PW service between the relays. In the current embodiment, the Master 101 and Slave 102 are transmitting and receiving on the same service tunnels pair and when switching to a protection path, the same behavior is applied for transmission and reception of packets. Further, the current embodiment is directed towards the jitter buffer latency being symmetrical at both ends of the TDM PW and therefore upon switching to the protection path, the TDM PW jitter buffer must be reset and filled to the expected halfway point.

Figure 2:
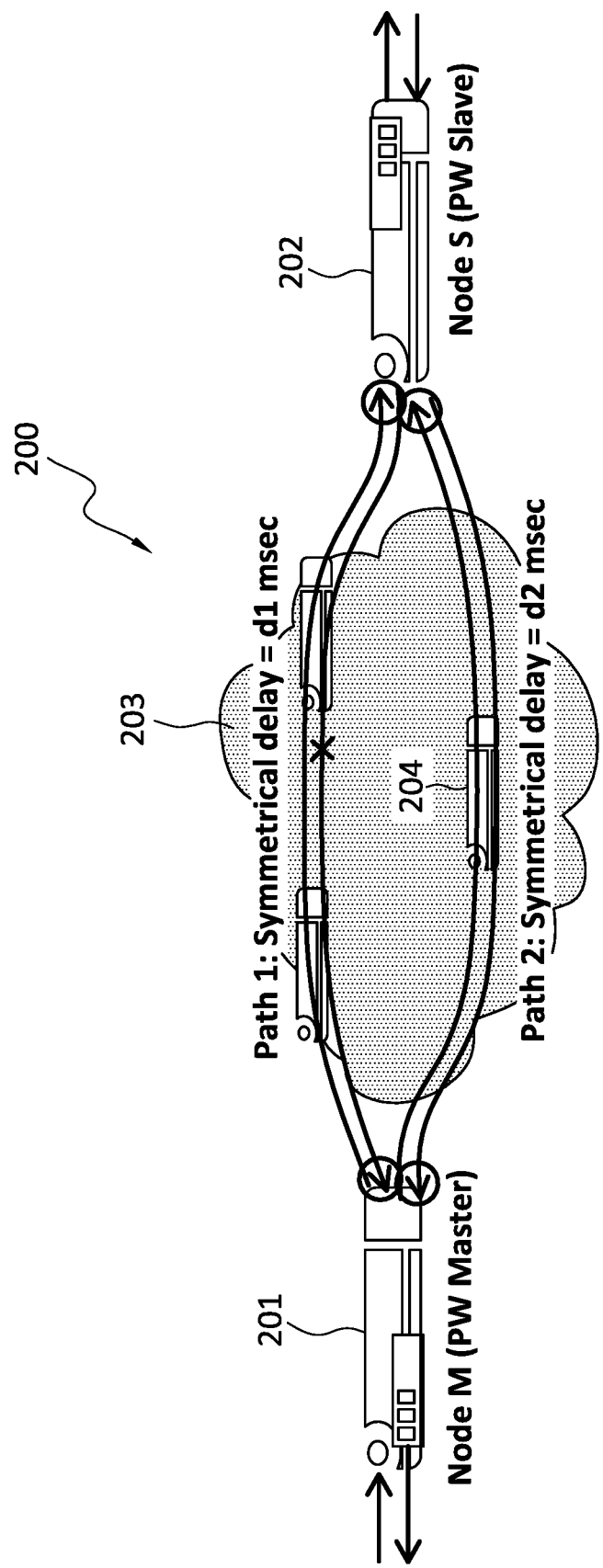
FIG. 2 illustrates a block diagram where multiple paths exist where traffic is received from the active service tunnel pair in the current embodiment.

FIG. 2 illustrates a block diagram 200 where multiple paths exist where traffic is received from the active service tunnel in the current embodiment.

The block diagram 200 includes a Master 201, Slave 202, Path 1 203 which has a symmetrical delay of d1 msec and Path 2 204 which has a symmetrical delay of d2 msec.

The software for the TDM PW service may be modified to discard any packets received on the service tunnel pair that is not the active path.

However, by applying this change to all PW or even to all TDM PW, the change may impact and degrade the switch time. Therefore, since this requirement is only for latency sensitive devices, this requirement may only be applied to TDM PW, which are used for latency sensitive devices.

When switching to the protection path, coordinating the switch between the Master 201 and the Slave 202 at the same precise time is difficult and packet loss may occur after a PSN failure, therefore, it is difficult to guarantee that the jitter buffer latency at both ends of the TDM PW have the same delay. Therefore, the current embodiment is directed towards resetting the jitter buffer at both ends and may restart the ADC sampling algorithm.

FIG. 3C illustrates a block diagram 300 where multiple paths exist where there is deferred asymmetry after a path switchover in the current embodiment.

In order to avoid a deferred asymmetry, the TDM service may automatically reset the jitter buffer and run ADC after a switchover to a different path, if the ADC is enabled for the TDM PW.

For example, FIG. 3A illustrates the jitter buffer 305 at Slave 302 when using Path 1 303 at a halfway point and FIG. 3B illustrates the jitter buffer 305 at Slave 302 after switching to protection path 304 where the jitter buffer 305 is below the halfway point which causes the deferred asymmetry.

When the receiving end switches to a new protection path, or when the receiving end switches to a new active path, the jitter buffer must be reset at the Master 301 and Slave 302 ends and restart the algorithm to bring the jitter buffer to the expected halfway point.

The block diagram includes a Master 301, Slave 302, Path 1 303 which has a symmetrical delay of d1 msec and Path 2 304 which has a symmetrical delay of d2 msec.

In order to reset the algorithm to bring the jitter buffer to the expected half way point, there are two methods that may be employed. It may be reset using the control plane or the dataplane.

When using the control plane and when the Master 301 or Slave 302 switch their transmission and reception to a new protection path or to an active path, the jitter buffer in the datapath may be reset through internal control messaging either with in-band control messaging through the fabric or out-of-band control messaging through dedicated control plane communication channel.

Teleprotection device may declare a false-positive with this type of implementation in the current embodiment, if the jitter buffer has a different latency than the opposite direction path, because of delays in the communication between the Master 301 and the Slave 302 and delays in processing control messages.

When using the dataplane, the dataplane may be represented by logical elements such as ingress processing, egress processing and switch fabric. These elements may reside in different hardware entities in the system or even within the same hardware entity. It may reside in a cloud networking architecture implementing a Network Function Virtualization ("NFV").

Figure 4A:
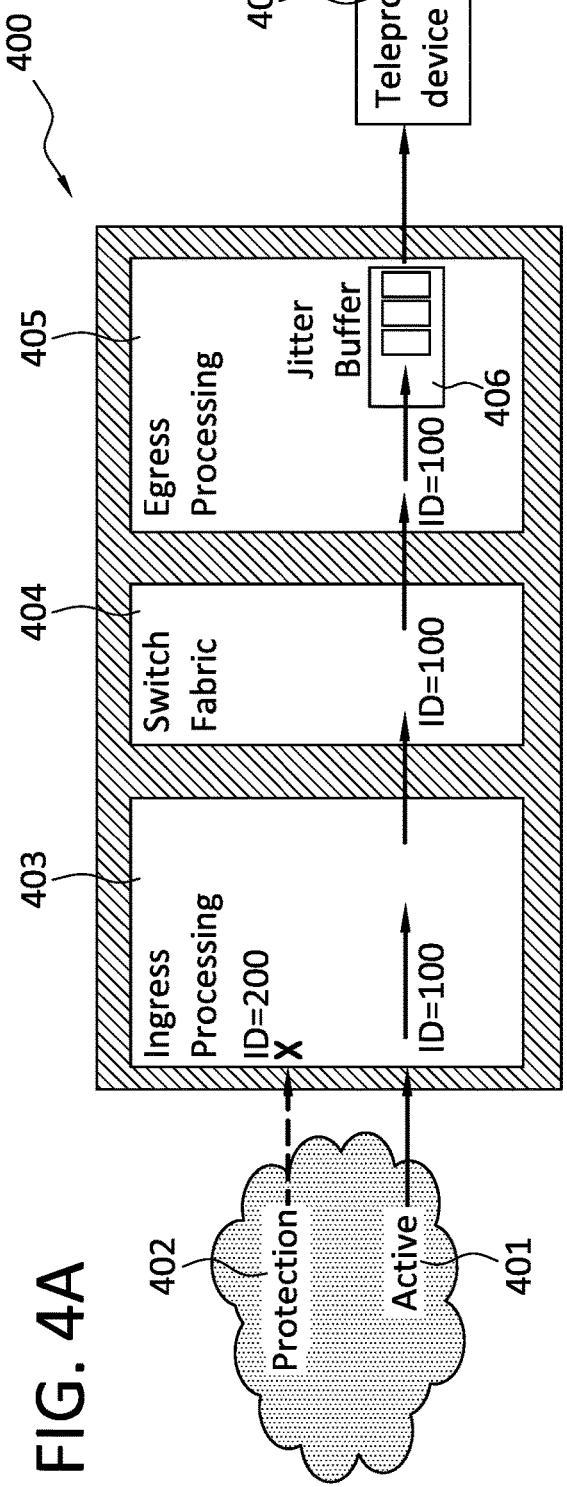
FIGS. 4A and 4B illustrate a block diagram for the logical elements of a dataplane TDM PW steady state and operational in the current embodiment.
Figure 4B:
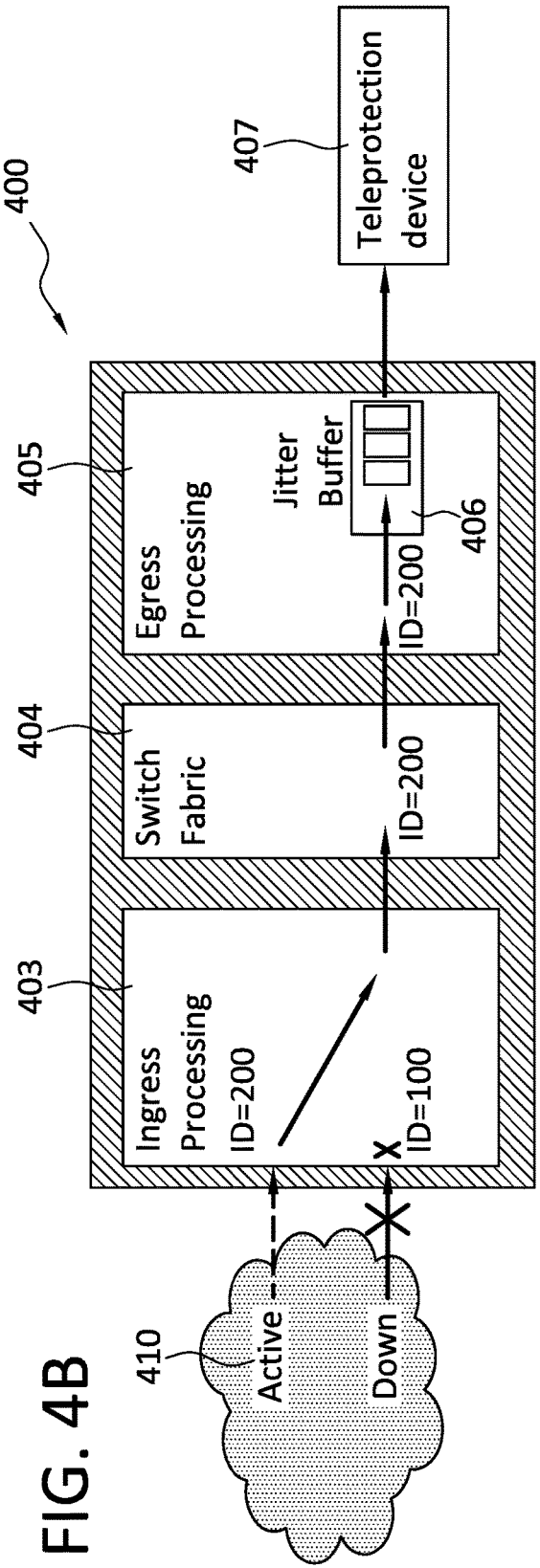

FIGS. 4A and 4B illustrate a block diagram 400 for the logical elements of a dataplane TDM PW steady state and operational in the current embodiment.

FIG. 4A includes two paths, an active path 401 and a protection path 402. The active path 401 transmits the ID=100 from ingress processing 403, to switch fabric 404 to egress processing 405, which includes the jitter buffer 406 and to the teleprotection device 407.

The TDM PW accepts traffic from a single service tunnel pair, which is the active path at all time, the ID is sent to the egress processing for the egress processing to monitor any changes in the ID.

Upon a change in the active service tunnel pair, both ends of the TDM PW may start transmitting on the new active path (i.e., the protection path 402). Each of the TDM PW are monitoring the active service tunnel pair, on the egress processing 405 side, for a change in service tunnel pair ID.

When the first packet is received from the new active path (i.e. the protection path 402), the egress processing 405 may detect the change and reset the jitter buffer 406, which is emptying the jitter buffer, restarting the leveling algorithm and losing communication between the teleprotection devices.

FIG. 4B includes the active path 410 (previously the protection path 402). During the leveling of the jitter buffer 406, communication with the teleprotection device 407 will be lost which prevents the teleprotection device 407 from declaring a false positive.

Once the jitter buffer 406 leveling algorithm has completed, the communication with the teleprotection device 407 is restored and if both ends of the TDM PW have completed the leveling algorithm, the two teleprotection devices may communicate.

When using the dataplane method, the control plane intervention is not required and the jitter buffer reset is instantaneous, with the first packet received on the active path 410. The current embodiment provides an immunity to network changes where if the active path was to change rapidly, it would be reset again on the first packet of the newly active path and there would not be any case where the TDM PW latency would be asymmetrical.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for guaranteeing symmetrical delay in both directions for a Time-Division Multiplexing Pseudowire ("TDM-PW") service on a packet switching network ("PSN"), the method comprising the steps of:
   using a transport method to specify a first path including a corresponding pair of unidirectional service tunnels for the TDM PW service between a master router and a slave router;
   detecting a failure on either of the corresponding pair of unidirectional service tunnels of the first path between the master router and the slave router;
   switching the master router and the slave router to a second path including a corresponding pair of unidirectional service tunnels;
   resetting a jitter buffer on the master router and the slave router and adjusting the jitter buffer to a halfway point; and
   transmitting and receiving data using the second path including the corresponding pair of unidirectional service tunnels.

2. The method for guaranteeing symmetrical delay in both directions for a TDM PW service on a PSN of claim 1, further comprising the step of:
   running a Asymmetry Delay Compensation ("ADC") sampling algorithm after switching to the second path.

3. The method for guaranteeing symmetrical delay in both directions for a TDM PW service on a PSN of claim 1, wherein detecting that the first path is unavailable is by one of detection of a loss of signal, bidirectional forwarding detection failure, label-switched path being down and the pair of corresponding service tunnels of the first path and the pair of corresponding service tunnels of the second path being down.

4. The method for guaranteeing symmetrical delay in both directions for a TDM PW service on a PSN of claim 1, wherein the master router and the slave router include the pair of corresponding service tunnels of the first path and the pair of corresponding service tunnels of the second path which provide the first path and the second path between the master router and the slave router.

5. The method for guaranteeing symmetrical delay in both directions for a TDM PW service on a PSN of claim 1, wherein the first path and the second path include two unidirectional label-switched paths with strict hop-by-hop routing over the master router and the slave router.

6. The method for guaranteeing symmetrical delay in both directions for a TDM PW service on a PSN of claim 1, wherein the TDM PW service discards any data which is received on the second path before the switching to the second path.

7. The method for guaranteeing symmetrical delay in both directions for a TDM PW service on a PSN of claim 1, wherein the TDM PW service discards any data which is received on the first path after the switching to the second path.

8. The method for guaranteeing symmetrical delay in both directions for a TDM PW service on a PSN of claim 1, wherein running the ADC sampling algorithm adjusts the jitter buffer to a halfway point.

9. The method for guaranteeing symmetrical delay in both directions for a TDM PW service on a PSN of claim 1, wherein the jitter buffer is reset through a control plane through internal control messaging with in-band control messaging.

10. The method for guaranteeing symmetrical delay in both directions for a TDM PW service on a PSN of claim 1, wherein the jitter buffer is reset through a control plane through internal control messaging with out-of-band control message through a control plane communication channel.

11. The method for guaranteeing symmetrical delay in both directions for a TDM PW service on a PSN of claim 1, wherein the jitter buffer is reset through a dataplane including ingress processing and egress processing.

12. A non-transitory computer readable medium storing program code for guaranteeing symmetrical delay in both directions for a TDM PW service on a PSN, the program code being executable by a processor to perform operations comprising:
   using a transport method to specify a first path including a corresponding pair of unidirectional service tunnels for the TDM PW service between a master router and a slave router;
   detecting a failure on either of the corresponding pair of unidirectional service tunnels of the first path between the master router and the slave router;
   switching the master router and the slave router to a second path including a corresponding pair of unidirectional service tunnels;
   resetting a jitter buffer on the master router and the slave router and adjusting the jitter buffer to a halfway point; and
   transmitting and receiving data using the second path including the corresponding pair of unidirectional service tunnels.

13. The non-transitory computer readable medium of claim 12, further comprising:
   running a Asymmetry Delay Compensation ("ADC") sampling algorithm after switching to the second path.

14. The non-transitory computer readable medium of claim 12, wherein detecting that the first path is unavailable is by one of detection of a loss of signal, bidirectional forwarding detection failure, label-switched path being down and the pair of corresponding service tunnels of the first path and the pair of corresponding service tunnels of the second path being down.

15. The non-transitory computer readable medium of claim 12, wherein the master router and the slave router include the pair of corresponding service tunnels of the first path and the pair of corresponding service tunnels of the second path which provide the first path and the second path between the master router and the slave router.

16. The non-transitory computer readable medium of claim 12, wherein the first path and the second path include two unidirectional label-switched paths with strict hop-by-hop routing over the master router and the slave router.

17. The non-transitory computer readable medium of claim 12, wherein the TDM PW service discards any data which is received on the second path before the switching to the second path.

18. The non-transitory computer readable medium of claim 12, wherein the TDM PW service discards any data which is received on the first path after the switching to the second path.

19. The non-transitory computer readable medium of claim 12, wherein running the ADC sampling algorithm adjusts the jitter buffer to a halfway point.

20. The non-transitory computer readable medium of claim 12, wherein the jitter buffer is reset a control plane through internal control messaging with in-band control messaging.

21. The non-transitory computer readable medium of claim 12, wherein the jitter buffer is reset through a control plane through internal control messaging with out-of-band control message through a control plane communication channel.

22. The non-transitory computer readable medium of claim 12, wherein the jitter buffer is reset through a data-plane including ingress processing and egress processing.

* * * * *